United States Patent
Mohr (10) Patent No.: US 10,464,171 B2
(45) Date of Patent: Nov. 5, 2019

(54) METHOD FOR ADDITIVE MANUFACTURING OF TURBOMACHINE COMPONENTS

(71) Applicant: DRESSER-RAND COMPANY, Olean, NY (US)

(72) Inventor: Byron Mohr, Olean, NY (US)

(73) Assignee: DRESSER-RAND COMPANY, Olean, NY (US)

(*) Notice: Subject to any disclaimer, the term of this patent is extended or adjusted under 35 U.S.C. 154(b) by 236 days.

(21) Appl. No.: 15/523,683

(22) PCT Filed: Oct. 21, 2015

(86) PCT No.: PCT/US2015/056567
§ 371 (c)(1),
(2) Date: May 2, 2017

(87) PCT Pub. No.: WO2016/073193
PCT Pub. Date: May 12, 2016

(65) Prior Publication Data
US 2017/0334023 A1   Nov. 23, 2017

Related U.S. Application Data

(60) Provisional application No. 62/074,694, filed on Nov. 4, 2014.

(51) Int. Cl.
*B23K 26/342* (2014.01)
*B33Y 50/02* (2015.01)
(Continued)

(52) U.S. Cl.
CPC .......... *B23K 26/342* (2015.10); *B22F 1/0003* (2013.01); *B22F 3/1055* (2013.01);
(Continued)

(58) Field of Classification Search
CPC ...... B23K 26/342; B33Y 50/02; B33Y 10/00; B33Y 70/00; B33Y 80/00; B22F 5/009; B22F 7/062
See application file for complete search history.

(56) References Cited

U.S. PATENT DOCUMENTS 4,832,982 A    5/1989  Mori et al.
9,950,388 B2 * 4/2018  Chivers ............... B22F 5/04
(Continued)

FOREIGN PATENT DOCUMENTS

WO    2014071135 A1    5/2014
WO    2014071968 A1    5/2014
(Continued)

OTHER PUBLICATIONS

Clayton, Rodney Michael, "The use of elemental powder mixes in laser-based additive manufacturing", XP055471591, Retrieved from the Internet: URL:https://scholarsmine.mst.edu/cgi/viewcontent.cgi?article=8193&context=masters_theses, Jan. 1, 2013, 116 pages.
(Continued)

*Primary Examiner* — Kevin L Lee (57) ABSTRACT

A method for fabricating a turbomachine component including a metal alloy with a layering device is provided. The method for fabricating the turbomachine component may include combining two or more elemental powders to form a powdered material. The method for fabricating the turbomachine component may also include forming a first metal alloy layer of the turbomachine component on a substrate. Forming the first metal alloy layer on the substrate may include melting a first portion of the powdered material to a first molten material with a heat source, mixing the first molten material with the heat source, and cooling the first molten material. The method for fabricating the turbomachine component may further include forming a second
(Continued)

metal alloy layer of the turbomachine component on the first metal alloy layer, and binding the first metal alloy layer with the second metal alloy layer.

14 Claims, 6 Drawing Sheets

(51) Int. Cl.
| | |
|---|---|
| *B22F 3/105* | (2006.01) |
| *B22F 5/00* | (2006.01) |
| *B22F 7/06* | (2006.01) |
| *B33Y 10/00* | (2015.01) |
| *B33Y 70/00* | (2015.01) |
| *B33Y 80/00* | (2015.01) |
| *B22F 1/00* | (2006.01) |
| *B22F 7/08* | (2006.01) |
| *B33Y 40/00* | (2015.01) |
| B23K 101/00 | (2006.01) |
| B23K 103/08 | (2006.01) |
| *B22F 3/15* | (2006.01) |

(52) U.S. Cl.
CPC .............. *B22F 5/009* (2013.01); *B22F 7/062* (2013.01); *B22F 7/08* (2013.01); *B33Y 10/00* (2014.12); *B33Y 40/00* (2014.12); *B33Y 50/02* (2014.12); *B33Y 70/00* (2014.12); *B33Y 80/00* (2014.12); *B22F 3/15* (2013.01); *B22F 2998/10* (2013.01); *B23K 2101/001* (2018.08); *B23K 2103/08* (2018.08); *Y02P 10/295* (2015.11)

(56) References Cited

U.S. PATENT DOCUMENTS

| | | |
|---|---|---|
| 2009/0280269 A1 | 11/2009 | Bewlay et al. |
| 2010/0176097 A1 | 7/2010 | Zhu |
| 2012/0100030 A1 | 4/2012 | Green |
| 2013/0066812 A1 | 3/2013 | Nehme et al. |
| 2017/0252806 A1* | 9/2017 | Wienberg .......... B23K 26/0823 |

FOREIGN PATENT DOCUMENTS

| | | |
|---|---|---|
| WO | 2014110679 A1 | 7/2014 |
| WO | 2014120991 A1 | 8/2014 |
| WO | 2014128169 A1 | 8/2014 |

OTHER PUBLICATIONS

PCT International Search Report and Written Opinion dated Feb. 24, 2016 corresponding to PCT Application PCT/US2015/056567 filed Oct. 21, 2015.

\* cited by examiner

METHOD FOR ADDITIVE MANUFACTURING OF TURBOMACHINE COMPONENTS

This application claims priority to U.S. Provisional Patent Application having Ser. No. 62/074,694, which was filed Nov. 4, 2014. The aforementioned patent applications are hereby incorporated by reference in their entirety into the present application to the extent consistent with the present application.

BACKGROUND

Conventional turbomachines, such as turbines, compressors, and compact motor-compressors, may often be utilized in a myriad of applications and industrial processes that expose the turbomachines and/or components thereof to extreme operating conditions (e.g., high temperatures, mechanical stress, and oxidation). Accordingly, the turbomachines and/or components thereof may often be fabricated from materials, such as metals and alloys, to endure these extreme operating conditions. For example, conventional turbomachines and/or components thereof may often be fabricated from superalloys (e.g., Inconel®) that may exhibit increased strength, stiffness, resistance to creep, and/or resistance to high temperature oxidation. However, in order to fabricate the turbomachines and/or the components thereof with the superalloys, time consuming casting methods (e.g., vacuum casting) may often be employed.

In view of the foregoing, attempts have been made to fabricate the turbomachines and/or the components thereof via additive manufacturing or three-dimensional (3D) printing. 3D printing is a process of fabricating a 3D object (e.g., the turbomachine and/or the components thereof) from a digital design or model of the 3D object. To fabricate the 3D object, the digital model may be separated or sliced into multiple layers, and a tool path may be generated for each of the multiple layers. An additive manufacturing device or system (e.g., 3D printer) may utilize the tool path of each of the multiple layers and a powdered feedstock (e.g., powdered metals, powdered superalloys, etc.) to fabricate the 3D object in a layer-by-layer manner. While 3D printing may be utilized to fabricate the turbomachines and/or the components thereof from powdered superalloys, producing, purchasing, and/or utilizing the powdered superalloy may often be cost-prohibitive. For example, a conventional process of producing the powdered superalloys may include vacuum induction melting and inert gas atomization, which are often relatively costly processes that may increase the overall cost of utilizing the powdered superalloys as the powdered feedstock.

What is needed, then, are improved additive manufacturing systems and methods for fabricating superalloy-based turbomachine components with a cost-effective mixture of elemental powders.

SUMMARY

Embodiments of the disclosure may provide a method for fabricating a turbomachine component comprising a metal alloy. The method may include combining two or more elemental powders to form a powdered material, and forming a first metal alloy layer of the turbomachine component on a substrate. Forming the first metal alloy layer may include melting a first portion of the powdered material to a first molten material with a heat source, mixing the first molten material with the heat source, and cooling the first molten material to form the first metal alloy layer. The method may also include forming a second metal alloy layer of the turbomachine component on the first metal alloy layer. The method may further include binding the first metal alloy layer with the second metal alloy layer to fabricate the turbomachine component.

Embodiments of the disclosure may also provide a method for fabricating a rotor of a turbomachine with a layering device. The method may include fabricating a first section of the rotor with the layering device. The first section of the rotor may include a first impeller integrally formed with a first portion of a rotary shaft. The method may also include fabricating a second section of the rotor with the layering device. The second section of the rotor may include a second impeller integrally formed with a second portion of the rotary shaft. The method may further include coupling the first section with the second section to fabricate the rotor of the turbomachine.

Embodiments of the disclosure may further provide a method for fabricating a rotor of a turbomachine including a metal alloy via additive manufacturing. The method may include combining a plurality of elemental powders to form a powdered material. The method may also include fabricating a first section of the rotor with a layering device. The first section of the rotor may include a first impeller integrally formed with a first portion of a rotary shaft. Fabricating the first section with the layering device may include generating a digital model of the first section of the rotor with a computer aided design assembly, partitioning the digital model into at least a first digital cross-section and a second digital cross-section, forming a first metal alloy layer of the first section on a substrate using the first digital cross-section as a template, forming a second metal alloy layer of the first section on the first metal alloy layer, and binding the first metal alloy layer with the second metal alloy layer to fabricate the first section of the rotor. Forming the first metal alloy layer of the first section may include melting a first portion of the powdered material to a first molten material with a laser, mixing the first molten material with the laser, and cooling the first molten material to form the first metal alloy layer. The method may also include fabricating a second section of the rotor with a layering device. The second section of the rotor may include a second impeller integrally formed with a second portion of the rotary shaft. The method may further include coupling the first section with the second section to fabricate the rotor of the turbomachine.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

A metallic article, such as a turbomachine and/or a component thereof, fabricated via additive manufacturing (AM) or 3D printing may include a plurality of layers fused, bound, or otherwise coupled with one another. Each of the layers may include at least one metal alloy. The metal alloy may be a superalloy, such as a nickel-based superalloy or a cobalt-based superalloy. Illustrative nickel-based superalloys may include, but are not limited to, Nimonic alloys, Inconel alloys, rhenium containing superalloys (e.g., Rene N5, CMSX-4®, PWA 1484, Rene N6, etc.), or the like. Illustrative cobalt-based superalloys may include, but are not limited to, FSX-414, SteHite® 21, SteHite® 31, MarM302, MarM509, Haynes-188, or the like. The metal alloy may also be a high temperature metal alloy, such as stainless steel, an alloy of titanium, an alloy of chromium, or the like. The metal alloy of each of the layers may be formed from one or more powdered materials. The powdered materials used to form the metal alloy of each of the layers may include one or more metals, one or more metalloids, one or more non-metals, one or more additives, or any combination thereof. One or more properties of the powdered materials used to form the metal alloy of each of the layers may at least partially determine one or more properties of the metal alloy formed for each of the layers. For example, a relative concentration or amount of the metals, the metalloids, the non-metals, and/or the additives contained in the powdered materials used to form the metal alloy of each of the layers may be varied (i.e., increased or decreased) to control the metal alloy formed for each of the layers. In another example, a particle size and/or a particle shape of the powdered materials used to form the metal alloy of each of the layers may be varied (i.e., increased or decreased) to control the metal alloy formed for each of the layers. The metal alloy formed for each of the layers may be the same or different.

The one or more metals of the powdered materials may be or include one or more alkali metals, one or more alkaline earth metals, one or more post-transition metals, or any mixtures or compounds thereof. The metals of the powdered materials may also include one or more transition metals. Illustrative transition metals may include, but are not limited to, chromium, iron, cobalt, molybdenum, tungsten, tantalum, titanium, zirconium, niobium, rhenium, yttrium, vanadium, hafnium, or any mixtures or compounds thereof. The one or more metalloids of the powdered materials may include, but are not limited to, boron, silicon, antimony, or any mixtures or compounds thereof. The one or more non-metals of the powdered materials may include, but are not limited to, carbon, sulfur, phosphorus, or the like, or any mixtures or compounds thereof. For example, the non-metals may include carbon black, graphite, carbon nanomaterials, or the like, or any combination thereof.

The one or more additives of the powdered materials may be or include, but are not limited to, one or more lubricants. The lubricants may be configured to increase flow and/or reduce friction during one or more fabrication processes. For example, the lubricants may be or form a coating of the powdered materials, and the coating may be configured to reduce friction between the powdered materials during one or more pressing or compaction processes. In another example, the lubricants may be combined with the metals, the metalloids, and/or the non-metals and configured to reduce friction between the metals, the metalloids, and/or the non-metals during the pressing processes. Illustrative lubricants may include, but are not limited to, one or more organic compounds such as stearic acid, stearin, metallic stearates, or the like, or any combination thereof.

The additives of the powdered materials may also be or include one or more binders. The binders may be configured to combine, couple, and/or agglomerate the metals, the metalloids, and/or the non-metals with one another. For example, the binder may be configured to facilitate the agglomeration of the metals, the metalloids, and/or the non-metals with one another to form the powdered materials. In another example, the binder may be configured to facilitate the binding of the metals, the metalloids, and/or the non-metals with one another to form the metal alloy. The binders may be or include one or more metallic binders, inorganic binders, organic binders, or any combination thereof. Illustrative metallic binders may include, but are not limited to, any one or more transition metals including, but not limited to, magnesium, ruthenium, osmium, iron, cobalt, nickel, copper, molybdenum, tantalum, tungsten, rhenium, or any mixtures, compounds, or alloys thereof. The metallic binders may also include, but are not limited to, any alkali metals including, but not limited to, lithium, sodium, potassium, rubidium, cesium, or any mixtures, compounds, or alloys thereof. Illustrative organic binders may be or include, but are not limited to, one or more waxes or resins that are insoluble, or at least substantially insoluble, in water. Waxes may include, for example, animal waxes, vegetable waxes, mineral waxes, synthetic waxes, or any combination thereof. The additives of the powdered materials may further include one or more oxidation resistance additives.

Figure 1:
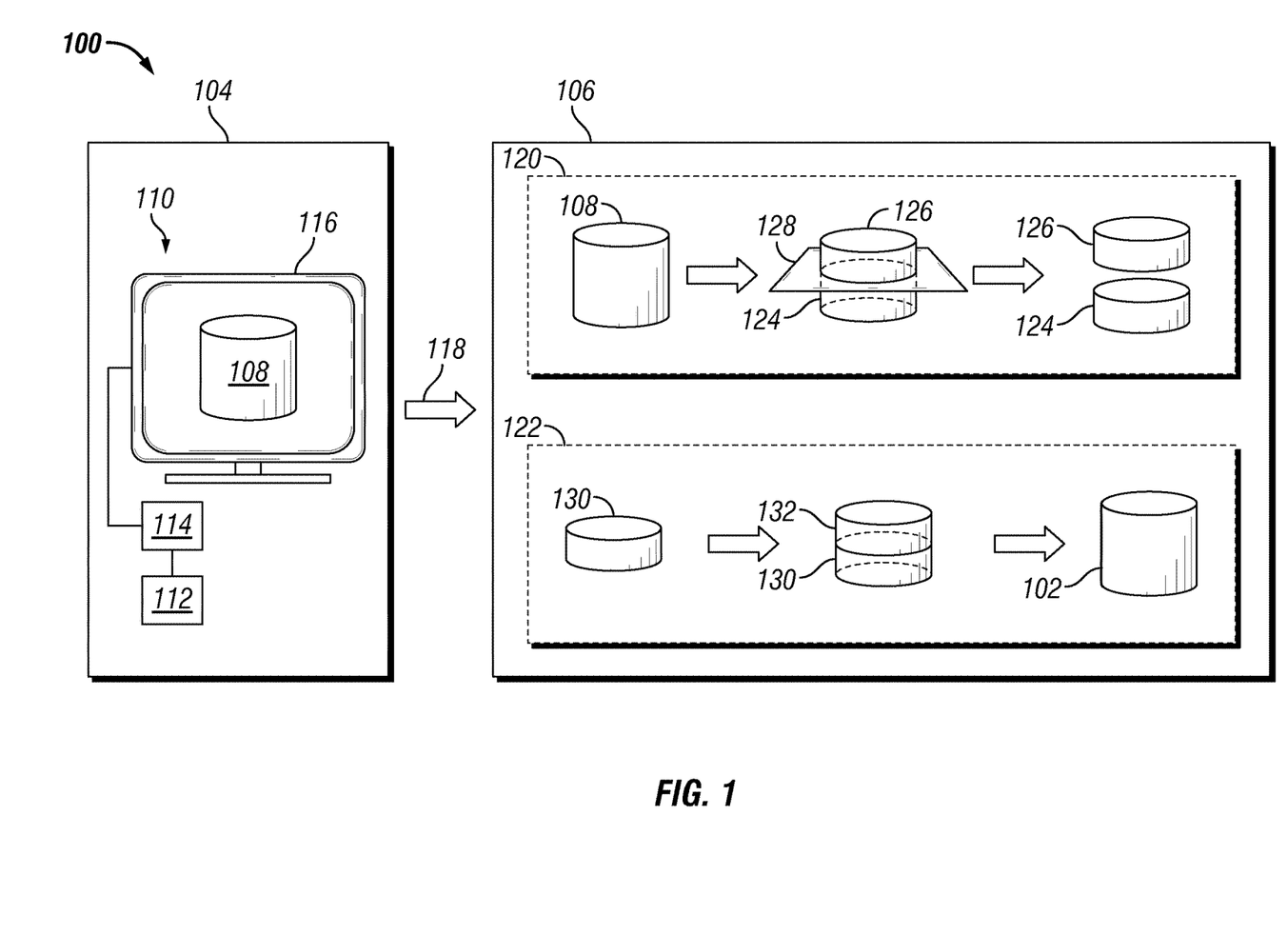
FIG. 1 illustrates a schematic of an exemplary system for fabricating a metallic article from powdered materials via additive manufacturing, according to one or more embodiments disclosed.

FIG. 1 illustrates a schematic of an exemplary system 100 for fabricating a metallic article 102 (e.g., a turbomachine component) from the powdered materials via additive manufacturing or 3D printing, according to one or more embodiments. The system 100 may include a computer aided design (CAD) assembly 104 and a layering device 106. The CAD assembly 104 may include any software capable of providing or generating a geometry or digital model 108 of the metallic article 102 in three dimensions. As further described herein, the layering device 106 may utilize the digital model 108 as a template or guide to fabricate the metallic article 102 in a layer-by-layer manner. The layering device 106 may be or include any device (e.g., 3D printer) capable of fabricating the metallic article 102 using the digital model 108 as a template. Illustrative layering devices may include, but are not limited to, PROJET® 1000, PROJET® 1500, PROJET® SD 3500, PROJET® HD 3500, PROJET® HD 3500PLUS, PROJET® 3500 HDMAX, PROJET® CP 3500, PROJET® CPX 3500, PROJET® CPX 3500PLUS, PROJET® 3500 CPXMAX, PROJET® 7000, PROJET® 6000, PROJET® 5000, PROJET® DP 3500, PROJET® MP 3500, ZPRINTER® 150, ZPRINTER® 250, ZPRINTER® 350, ZPRINTER® 450, ZPRINTER® 650, ZPRINTER® 850, ProX® 500, sPro® 140, sPro® 60 HD, sPro® 230, ProX® 100, ProX® 200, and/or ProX® 300, which are all commercially available from 3D Systems Corp. of Rock Hill, S.C. Illustrative layering devices may also include, but are not limited to, EOSINT® M 280, EOS® M 290, EOS® M 400, and/or PRECIOUS M 080, which are all commercially available from EOS of North America, Inc. of Novi, Mich. The layering devices may further include an AM250 laser melting machine commercially available from, or Renishaw Inc. of Hoffman Estates, Ill.

The CAD assembly 104 may include at least one computer 110 having a memory 112 (e.g., hard drives, random access memory, flash memory, etc.), one or more central processing units (one is shown 114), one or more input devices (e.g., keyboard and mouse) (not shown), one or more monitors 116 on which a software application can be executed, or any combination thereof. The memory 112 may store an operating system and/or any programs or software capable of providing or generating the digital model 108. The central processing unit 114 may work in concert with the memory 112 and/or the input devices (not shown) to perform tasks for a user or operator. The central processing unit 114 may be automated or may execute commands at the direction of the user. The computer 110 may interface with one or more databases, support computers or processors, the Internet, or any combination thereof. It may be appreciated that the term "interface" may refer to all possible internal and/or external interfaces, wired or wireless. While FIG. 1 illustrates the computer 110 as a platform on which the methods discussed and described herein may be performed, the methods may also be performed on any other platform or device having computing capabilities. For example, the layering device 106 may include a platform or device capable of generating the digital model 108.

The digital model 108 may include information or data defining one or more portions of the metallic article 102. For example, the digital model 108 may include 3D numerical coordinates of an entire geometry of the metallic article 102. The digital model 108 may define an inner surface, an outer surface, and/or a volume of the metallic article 102 to be fabricated by the layering device 106. The digital model 108 may be communicated to the layering device 106, as illustrated by arrow 118, and may provide the template to fabricate the metallic article 102.

The layering device 106 may fabricate the metallic article 102 from the digital model 108 in one or more processes (two are shown 120, 122). A first process 120 for fabricating the metallic article 102 from the digital model 108 may be or include a digital process. The digital process 120 may include dividing or partitioning the digital model 108 into two or more digital layers or digital cross-sections (two are shown 124, 126) using one or more digital horizontal planes (one is shown 128). For example, as illustrated in FIG. 1, the digital process 120 may include partitioning the digital model 108 into successive digital cross-sections 124, 126, which may be two dimensional (2D) or 3D. It may be appreciated that the layering device 106 may divide or partition the digital model 108 into any number of digital cross-sections 124, 126 using any number of digital horizontal planes 128. Each of the digital cross-sections 124, 126 may provide a template to fabricate at least a portion of the metallic article 102. For example, as illustrated in FIG. 1, each of the digital cross-sections 124, 126 may provide a template to fabricate each of the layers 130, 132 of the metallic article 102 in a second process 122. The digital cross-sections 124, 126 may include data defining the respective layers 130, 132 of the metallic article 102. For example, a first digital cross-section 124 may include data defining a first layer 130 of the metallic article 102, and a second digital cross-section 126 may include data defining a second layer 132 of the metallic article 102. Each of the digital cross-sections 124, 126 may include data defining an outer cross-sectional line, an inner cross-sectional line, a cross-sectional area, a volume, or any combination thereof. The respective inner and outer cross-sectional lines of each of the digital cross-sections 124, 126 may define respective inner and outer surfaces of each of the layers 130, 132 of the metallic article 102. Further, the respective cross-sectional area of each of the digital cross-sections 124, 126 may at least partially define a respective volume of each of the layers 130, 132.

As previously discussed, the layering device 106 may fabricate the metallic article 102 from the digital model 108 in one or more processes 120, 122, and the digital process 120 may include partitioning the digital model 108 into the digital cross-sections 124, 126. The second process 122 for fabricating the metallic article 102 from the digital model 108 may include fabricating each of the layers 130, 132 of the metallic article 102 from the powdered material. For example, the second process 122 may include sequentially forming each of the layers 130, 132 of the metallic article 102 using the respective digital cross-sections 124, 126 as a template. The second process 122 may also include binding the layers 130, 132 with one another to build or form the metallic article 102. Any number of layers 130, 132 may be formed and/or bound with one another to form the metallic article 102.

In an exemplary operation, illustrated in FIG. 1, the layering device 106 may fabricate the metallic article 102 by forming the first layer 130, forming the second layer 132, and combining or binding the first and second layers 130, 132 with one another. The first layer 130 may be formed on a substrate (not shown) configured to support the first layer 130 and/or any subsequent layers. Any one or more of the layers 130, 132 formed by the layering device 106 may provide or be a substrate for any subsequent layers deposited by the layering device 106. For example, the first layer 130 deposited by the layering device 106 may be or provide the substrate for the second layer 132 or any subsequent layers. In at least one embodiment, the formation of the second layer 132 and the binding of the second layer 132 to the first layer 130 may occur simultaneously. For example, the process of forming the second layer 132 may at least partially bind the second layer 132 to the first layer 130. In another embodiment, the formation of the second layer 132 and the binding of the second layer 132 with the first layer 130 may occur sequentially. For example, the second layer 132 may be formed adjacent or atop the first layer 130 in one process, and the second layer 132 may be bound, fused, or otherwise coupled with the first layer 130 in a subsequent process (e.g., a heating process). The layering device 106 may bind or fuse the first layer 130, the second layer 132, and/or any subsequent layers (not shown) with one another to fabricate the metallic article 102.

The formation and binding of the layers 130, 132 in the second process 122 may include a direct metal laser fusion (DMLF) process or a modification thereof. DMLF may include precision melting and solidification of a build material (e.g., the powdered material) into each of the successive layers 130, 132. In another embodiment, the formation and binding of the layers 130, 132 in the second process 122 may include a direct metal laser sintering (DMLS) process or a modification thereof. The formation and binding of the layers 130, 132 in the second process 122 may also include a direct metal deposition (DMD) process or a modification thereof. In yet another embodiment, the formation and binding of the layers 130, 132 may include a laser engineered net shaping (LENS) process or a modification thereof. The LENS process may include delivering a build material (e.g., the powdered materials) into a path (e.g., energy beam) of a high powered laser to form a molten pool of the powdered material, and solidifying the molten pool to form each of the layers 130, 132. The formation and binding of the layers 130, 132 may also include select laser melting (SLM), select laser sintering (SMS), electron beam melting (EBM), electron beam direct manufacturing (EBDM), or the like.

In at least one embodiment, the powdered materials used to form the metal alloy of each of the layers 130, 132 may include a powder of the metal alloy. For example, the powdered materials used to form a nickel-based superalloy may include a powder or particulates of the nickel-based superalloy (e.g., Inconel®). In another embodiment, the powdered materials used to form the metal alloy may include one or more elemental powders. For example, the powdered materials used to form the metal alloy may include the elemental powders of chemical elements (e.g., the metals, the metalloids, and/or the non-metals) or constituents of the metal alloy. In an exemplary embodiment, the metal alloy of one or more of the layers 130, 132 of the metallic article 102 may be Inconel®, which may include nickel, chromium, iron, molybdenum, niobium, cobalt, manganese, copper, aluminum, titanium, silicon, carbon, sulfur, phosphorus, and/or boron. Accordingly, the powdered materials used to form Inconel® may include elemental powders of nickel, chromium, iron, molybdenum, niobium, cobalt, manganese, copper, aluminum, titanium, silicon, carbon, sulfur, phosphorus, boron, or any mixture or compounds thereof. The elemental powders of the powdered materials may be mixed, combined, consolidated, or otherwise agglomerated with one another to form the powdered material. For example, the elemental powders may be tumbled in a mixing vessel to provide the powdered materials with a homogenous mixture of the elemental powders. In another example, the elemental powders may be agglomerated or combined with one another to form particles or particulates having a homogenous mixture of the elemental powders.

The metal alloy formed may be determined, at least in part, by one or more properties of the powdered materials and/or the elemental powders thereof. For example, the relative concentration or proportion of each of the elemental powders contained in the powdered materials may determine a composition of the metal alloy formed. It should appreciated that the elemental powders of the powdered materials may be combined or mixed in any proportions to produce any metal alloy having any desired composition. The elemental powders may be combined in proportions or ratios that are substantially equal to the stoichiometric composition of the metal alloy to be formed or desired (e.g., target metal alloy). For example, the proportions or concentrations of each of the elemental powders combined to form the powdered materials may be determined, at least in part, by a proportion of each of the chemical elements contained in the metal alloy desired and/or a stoichiometric composition of the metal alloy desired. In another example, if the metal alloy desired includes about 30 wt % of a first chemical element and about 70 wt % of a second chemical element, the powdered materials may include a first elemental powder of the first chemical element at about 30 wt % and a second elemental powder of the second chemical element at about 70 wt %. In an exemplary embodiment, the powdered materials used to form the metal alloy Inconel®® may include a mixture of the elemental powders of nickel, chromium, iron, molybdenum, niobium, cobalt, manganese, copper, aluminum, titanium, silicon, carbon, sulfur, phosphorus, and/or boron, where each of the elemental powders may be mixed at a proportion or ratio that approximates the stoichiometric composition of Inconel®.

The properties of the metal alloy formed may also be determined, at least in part, by respective particle shapes and/or sizes of each of the elemental powders contained in the powdered materials. The properties of the metal alloy formed may also be determined, at least in part, by particle shapes and/or sizes of the particulates (e.g., agglomerations of the elemental powders) of the powdered materials. The particle shapes and/or sizes of the elemental powders and/or the particulates may be controlled by subjecting each or a mixture of the elemental powders to one or more shaping and/or sizing processes. Illustrative shaping and/or sizing processes may include, but are not limited to, milling, granulation, or the like, or any combination thereof. As further described herein, the shaping and/or sizing of the elemental powders and the mixing and/or consolidation of the elemental powders may occur or be performed simultaneously.

In at least one embodiment, the elemental powders may be subjected to a milling process to mix the elemental powders with one another and form the powdered materials. For example, the elemental powders may be milled to mix the metals, the non-metals, and/or the additives with one another to form the powdered materials. The elemental powders may also be milled to coat or embed the metals, the non-metals, and/or the additives. For example, the elemental powders may be milled to coat the metals with the non-metals and/or the additives. Each or a mixture of the elemental powders may also be milled to reduce the sizes of the respective particles thereof. Each or a mixture of the elemental powders may also be milled to shape the respective particles thereof. For example, each or a mixture of the elemental powders may be milled to provide the respective particles thereof with irregular and/or angular shapes. In another example, each or a mixture of the elemental powders may be milled to provide the respective particles thereof with uniform shapes and/or sizes. Illustrative milling processes may include, but are not limited to, milling with media (e.g., ball milling and attritor milling), milling with a colloid mill, wet milling, or the like, or any combination thereof.

The powdered materials and/or the elemental powders thereof may be subjected to a granulation process to provide the respective particles and/or the agglomerations thereof with a uniform shape, size, and/or concentration. The powdered materials containing a mixture of the elemental powders may also be granulated to prevent the segregation or separation of the elemental powders from one another. For example, the elemental powders of the powdered materials may have varying densities, and segregation may cause the elemental powders having a relatively higher density to separate from the elemental powders having a relatively lower density. Accordingly, the powdered materials may be granulated to provide a more uniform mixture or concentration of the elemental powders throughout. The powdered materials and/or the elemental powders thereof may also be granulated to improve flow properties thereof. In an exemplary embodiment, the powdered materials may be milled and subsequently granulated to provide the powdered materials with particles having substantially uniform shapes and/or sizes and substantially equal concentrations and/or compositions of the elemental powders (e.g., the metals, the metalloids, and/or the non-metals). Illustrative granulation processes may include, but are not limited to, freeze granulation, sieve granulation, spray drying, or any combination thereof.

Figure 2:
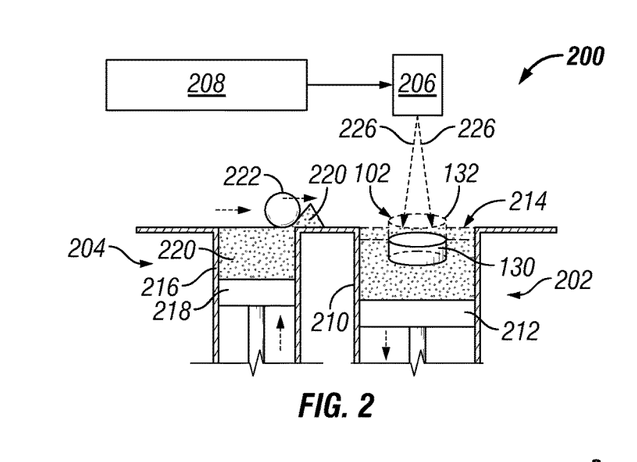
FIG. 2 illustrates a schematic of an exemplary layering device for forming and binding the layers of the metallic article of FIG. 1, according to one or more embodiments disclosed.

FIG. 2 illustrates another exemplary layering device 200 that may be utilized in the system 100 of FIG. 1, according to one or more embodiments. The layering device 200 may be configured to form and/or bind the layers 130, 132 (see FIG. 1) with one another to form the metallic article 102. The layering device 200 may also be configured to carry out or perform a DMLF process, a DMLS process, and/or a modification thereof. As illustrated in FIG. 2, the layering device 200 may include a fabrication assembly 202, a powder assembly 204, a scanner 206, and a heat source 208, such as a laser, or any combination thereof. As further illustrated in FIG. 2, the fabrication assembly 202 may include a feedstock or powder container 210 configured to contain a build material 220 (e.g., the powdered materials) and having a component support 212 disposed therein. The component support 212 may be configured to carry or hold the metallic article 102 during one or more fabrication processes of the layering device 200. The component support 212 may be adjustable or movable within the build container 210 in a vertical direction (e.g., z-axis) and may be movable to define a working volume 214 (shown in phantom) of the layering device 200. The powder assembly 204 may include a powder chamber 216 having a delivery support 218 configured to support the powdered materials 220. The delivery support 218 may be adjustable or movable within the powder chamber 216 in the vertical direction (e.g., z-axis). The powder assembly 204 may also include a roller or wiper 222 configured to transfer at least a portion of the powdered materials 220 from the powder assembly 204 to the fabrication assembly 202.

In at least one embodiment, the scanner 206 may focus or direct an energy beam, illustrated by arrows 226, along the working volume 214 to fuse the powdered materials 220 contained in the working volume 214 with one another to form the metal alloy and/or the layers 130, 132 of the metallic article 102. In another embodiment, the laser 208 may be translated or moved along an x-axis and/or a y-axis to direct the energy beam 226 thereof along the working volume 214. For example, the laser 208 may be mounted with a movable platform or frame (not shown) configured to translate the laser 208 along the x-axis and/or the y-axis.

In an exemplary operation of the layering device 200 with continued reference to FIG. 2, the delivery support 218 may be raised in the vertical direction to supply a portion of the powdered materials 220 disposed in the powder chamber 216 to the wiper 222, and the component support 212 may be lowered to provide an empty volume (i.e., the working volume 214) in the build container 210. The wiper 222 may spread or otherwise push the portion of the powdered materials 220 from the powder assembly 204 to the empty volume in the build container 210 to thereby form the working volume 214 of the powdered materials 220 in the fabrication assembly 202. The laser 208 and/or the scanner 206 may emit or otherwise focus the energy beam 226 onto the powdered materials 220 contained in the working volume 214 to selectively melt, sinter, or otherwise fuse at least a portion of the powdered materials 220 and/or the elemental powders thereof with one another to form the first layer 130 of the metallic article 102. For example, the energy beam 226 may selectively melt or fuse the powdered materials 220 and/or the elemental powders thereof into larger structures or agglomerations (e.g., molten powdered materials) by rapidly melting the powdered materials 220. As the energy beam 226 moves along the working volume 214 to melt or fuse the powdered materials 220, heat may be conducted from the previously melted or molten region of the working volume 214 to thereby rapidly cool and solidify the molten powdered materials 220 and form the metal alloy. As further described herein, the laser 208 and/or the energy beam 226 thereof may be configured to stir, blend, or otherwise mix the molten powdered materials 220 while concurrently melting the powdered materials 220 to form the respective metal alloy of each of the layers 130, 132 of the metallic article 102. After forming the first layer 130 of the metallic article 102 at least a portion of the powdered materials 220 in the working volume 214 may be melted and/or sintered to the metal alloy and another portion of the powdered materials 220 may be unmelted or unsintered.

After forming the first layer 130 of the metallic article 102, the component support 212 may be lowered to thereby lower the first layer 130 of the metallic article 102, and the delivery support 218 may be raised to supply another portion of the powdered materials 220 from the build container 216 to the wiper 222. The wiper 222 may spread the portion of the powdered materials 220 from the powder assembly 204 to the build container 210 to thereby form another working volume 214 of the powdered materials 220 in the fabrication assembly 202. The laser 208 may emit the energy beam 226 onto the powdered materials 220 forming the working volume 214 to selectively melt at least a portion of the powdered materials 220 into the larger structures or agglomerations (e.g., the molten powdered materials). Heat may be conducted from the previously molten region of the working volume 214 to thereby rapidly cool and solidify the molten powdered materials 220 to the metal alloy and form the second layer 132 (shown in phantom) of the metallic article 102. The fabrication process may be repeated to build the successive layers 130, 132 of the metallic article 102. As previously discussed, the formation of the second layer 132 may bind or couple the second layer 132 with the first layer 130. Further, as previously discussed, the second layer 132 may be coupled with the first layer 130 in a subsequent process (e.g., a heating and/or pressing process)

Figure 3A:
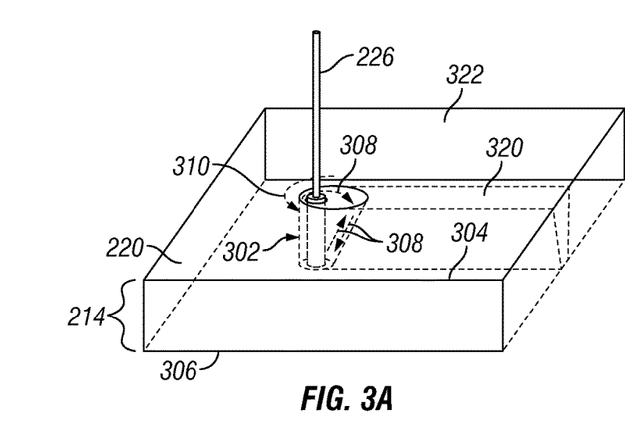
FIG. 3A illustrates a schematic of an energy beam melting and stirring a powdered material to form the layers of the metallic article of FIG. 1, according to one or more embodiments disclosed.
Figure 3B:
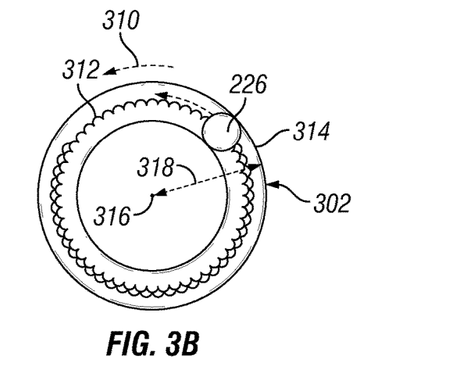
FIG. 3B depicts a plan view of an exemplary path of the energy beam of FIG. 3A, according to one or more embodiments disclosed.

As previously discussed, the laser 208 and/or the energy beam 226 thereof may be configured to concurrently melt and stir the powdered materials 220 to form the metal alloy of each of the layers 130, 132. FIG. 3A illustrates a schematic of the energy beam 226 melting and stirring the powdered material 220 to form the layers 130, 132 of the metallic article 102 of FIG. 1, according to one or more embodiments. FIG. 3B depicts a plan view of an exemplary path of the energy beam 226 of FIG. 3A, according to one or more embodiments. As illustrated in FIG. 3A, the energy beam 226 may be focused or directed along a portion of the working volume 214 to melt the powdered materials 220 contained therein and at least partially define a working region 302 of the energy beam 226 in the working volume 214. For example, the energy beam 226 may be directed along a top portion or surface 304 of the working volume 214 in any path to at least partially define the working region 302. As illustrated in FIG. 3A and further illustrated in detail in FIG. 3B, the energy beam 226 may be directed along the top surface 304 in a substantially circular path 310 to least partially define the working region 302. The working region 302 may extend from the top surface 304 of the working volume 214 to a bottom portion or surface 306 of the working volume 214. For example, the energy beam 226 may be configured to melt at least a portion of the powdered materials 220 disposed between the top and bottom surfaces 304, 306 of the working volume 214. As illustrated in FIG. 3A, the working region 302 may be a substantially frustum shaped portion of the working volume 214 extending between the top surface 304 and the bottom surface 306.

The energy beam 226 may be directed along the working volume 214 to melt the powdered materials 220. For example, as the energy beam 226 is directed along the top surface 304 of the working volume 214, the energy beam 226 may melt the powdered materials 220 contained in the working region 302. As the energy beam 226 moves along the working volume 214 to melt and stir the molten powdered materials 220, heat may be conducted from the working region 302 to rapidly cool and solidify the molten powdered materials 220 and form the metal alloy of each of the layers 130, 132 (see FIG. 1). For example, as illustrated in FIG. 3A, as the heat is conducted from the working region 302 to solidify the molten powdered materials 220, a first portion 320 of the powdered materials 220 in the working volume 214 may be sintered and solidified to the metal alloy, and another portion 322 of the powdered materials 220 in the working volume 214 may be unmelted or unsintered.

As illustrated by arrows 308 in FIG. 3A, a portion of the molten powdered materials 220 may flow or circulate within the working region 302. The flow or circulation 308 of the molten powdered materials 220 may mix or stir the molten powdered materials 220 and/or the elemental powders thereof. The flow or circulation 308 of the molten powdered materials 220 within the working region 302 may be facilitated and/or promoted by the path 310 of the energy beam 226. For example, the substantially circular path 310 of the energy beam 226 may facilitate and/or promote the flow 308 of the molten powdered materials 220 within and/or about the working region 302. As illustrated in FIG. 3A, the substantially circular path 310 of the energy beam 226 may also promote the flow 308 of the molten powdered materials 220 between the top surface 304 and the bottom surface 306 of the working volume 214.

The energy beam 226 may be oscillated to facilitate and/or promote the flow 308 of the molten powdered materials 220 within the working region 302. For example, the energy beam 226 may be oscillated while concurrently following the substantially circular path 310. The energy beam 226 may be oscillated in any direction and/or pattern. For example, as illustrated by line 312 in FIG. 3B, the energy beam 226 may oscillate radially while following the circular path 310. The energy beam 226 may oscillate radially from an outer circumference 314 of the working region 302 toward a center 316 of the working region 302. In at least one embodiment, the energy beam 226 may oscillate along a radial length 318 of the working region 302 extending between the outer circumference 314 and the center 316. In another embodiment, the energy beam 226 may oscillate along a portion of the radial length 318. The radial oscillation 312 and/or the circular path 310 of the energy beam 226 may facilitate and/or promote the flow 308 of the molten powdered materials 220 in the working region 302 to thereby promote the mixing of the molten powdered materials 220.

Figure 4:
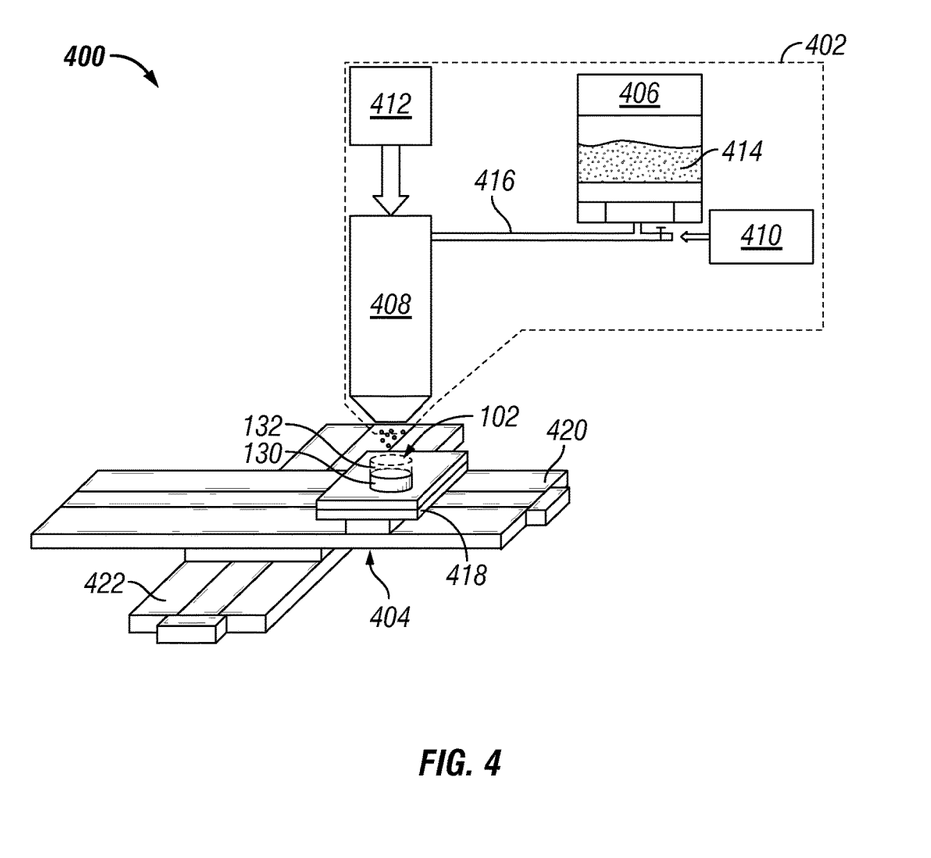
FIG. 4 illustrates another exemplary layering device for forming and binding the layers of the metallic article of FIG. 1, according to one or more embodiments disclosed.

While the DMLS process is described herein with reference to FIGS. 2, 3A, and 3B, other suitable additive manufacturing or 3D printing processes may also be employed to fabricate the metallic article 102. For example, FIG. 4 illustrates another exemplary layering device 400 that may be utilized in the system 100 of FIG. 1, according to one or more embodiments. The layering device 400 may be configured to form and/or bind the layers 130, 132 (see FIG. 1) with one another to form the metallic article 102. As illustrated in FIG. 4, the layering device 400 may include a fabrication assembly 402 and a stage 404 (e.g., an x,y-axis stage). The layering device 400 may be configured to carry out or perform a DMD process or a modification thereof. For example, the layering device 400 may be configured to deposit successive layers 130, 132 of molten powdered materials onto a substrate 418 and/or the layers 130, 132 of the metallic article 102.

The fabrication assembly 402 may include a powder feeder 406, a deposition nozzle 408, a gas supply 410, a heat source or laser 412, or any combination thereof. The powder feeder 406 may be configured to retain and dispense a build material 414 (e.g., the powdered materials). For example, as illustrated in FIG. 4, the powder feeder 406 may be configured to deliver the powdered materials 414 to a conduit 416 fluidly coupled therewith. The powdered materials 414 may be dispensed from the powder feeder 406 to the conduit 416 at a controlled rate and subsequently mixed with a gas (e.g., inert gas) from the gas supply 410. The gas from the gas supply 410 may carry or feed the powdered materials 414 to the deposition nozzle 408 via the conduit 416. The powdered materials 414 may then be dispensed from the deposition nozzle 408, melted by the laser 412, and deposited onto the substrate 418 to form each of the layers 130, 132 of the metallic article 102.

In at least one embodiment, the dispensing of the powdered materials 414 from the deposition nozzle, the melting of the powdered materials 408 by the laser 412, and/or the deposition of the molten powdered materials 414 may occur substantially simultaneously. In another embodiment, the dispensing of the powdered materials 414 from the deposition nozzle 408, the melting of the powdered materials 414 by the laser 412, and/or the deposition of the molten powdered materials 414 may occur sequentially. The laser 412 and/or an energy beam thereof may be configured to concurrently melt and stir or mix the powdered materials 414. For example, as previously discussed with reference to FIGS. 3A and 3B, the laser 412 and/or the energy beam thereof may follow a substantially circular path 310 and/or be radially oscillated 312 to concurrently melt and stir the molten powdered materials 414.

As the powdered materials 414 are deposited, the stage 404 may be translated or moved in a desired pattern to form the first layer 130 of the metallic article 102. The desired pattern may be determined by the digital model 108 (see FIG. 1). The stage 404 may be configured to move the substrate 418 in two-dimensions. For example, the stage 404 may include an X-axis track 420 and a Y-axis track 422 configured to move the substrate 418 along an X-axis and a Y-axis, respectively. The deposition nozzle 408 and/or the stage 404 may be configured to move along a Z-axis. For example, the stage 404 may be configured to be moved along the Z-axis to raise or lower the substrate 418 relative to the deposition nozzle 408.

The formation and binding of the layers 130, 132 of the metallic article 102 in any of the layering devices 106, 200, 400 described herein may be conducted or performed in an inert environment. For example, the melting, stirring, and/or cooling of the powdered materials by the layering devices 106, 200, 400 described herein may be conducted under vacuum or in the presence of one or more inert gases, such as argon and helium. The inert environment may prevent oxidation of the powdered materials during one or more processes (e.g., heating) of fabricating the metallic article 102.

The metal articles 102 fabricated with the layering devices 106, 200, 400 described herein may be subjected to one or more post-fabrication processes. The post-fabrication processes may include one or more heating and/or pressing processes. For example, the metallic articles 102 may be subjected to one or more pre-sintering processes to remove the additives (e.g., the lubricants and/or the binders) contained therein. The pre-sintering process may include heating the metallic articles 102 under vacuum and/or in an inert environment. The pre-sintering process may include heating the metallic articles 102 to a temperature of about 500° C. to about 1400° C. The metallic articles 102 may also be subjected to one or more sintering processes to further fuse or bind the powdered materials and/or the elemental powders thereof with one another. The heating and pressing process may increase the density, strength, toughness, and/or hardness of the metallic articles 102. Illustrative heating and pressing processes may include, but are not limited to, vacuum sintering, hot isostatic pressing (HIP), or any combination thereof. It should appreciated that any of the heating and pressing processes may be conducted in an inert environment (e.g., under vacuum and/or in the presence of the inert gases). The metallic articles 102 fabricated with the layering devices 106, 200, 400 may also be subjected to one or more machining and/or shaping processes. For example, the metallic articles 102 fabricated by the layering devices 106, 200, 400 may be subjected to the machining processes to define additional features (e.g., undercuts, holes, flanges, etc.) to the metallic articles 102. Illustrative machining and/or shaping processes may include, but are not limited to, drilling, milling, cutting, grinding, or the like, or any combination thereof.

The layering devices 106, 200, 400 described herein may be utilized to fabricate turbomachines and/or the turbomachine components. For example, the metallic article 102 formed by the layering devices 106, 200, 400 may be a turbomachine or a turbomachine component. Illustrative turbomachines may include, but are not limited to, single- or multi-stage centrifugal compressors, single- or multi-stage steam turbines, single- or multi-stage gas turbines, single- or multi-stage expanders, single- or multi-stage reciprocating compressors, rotating separators, supersonic compressors, gas engines, diesel engines, mechanical fasteners, or the like. Illustrative turbomachine components that may be fabricated by the layering devices 106, 200, 400 may include, but are not limited to, impellers, blades, vanes, casings, diaphragms, stators, bearings, heads, heads, pistons, cylinders, rods, shafts, rotary shafts, sleeves, balance pistons, cross-heads, piston rods, connecting rods, crankcases, engine blocks, turbine discs, shroud rings, nose cones, inlet cases, exhaust cases, intermediate casings, valve blocks, nozzle blocks, inlet nozzles, discharge or outlet nozzles, inlet walls, division walls, discharge walls, labyrinth seals, or the like.

Figure 5:
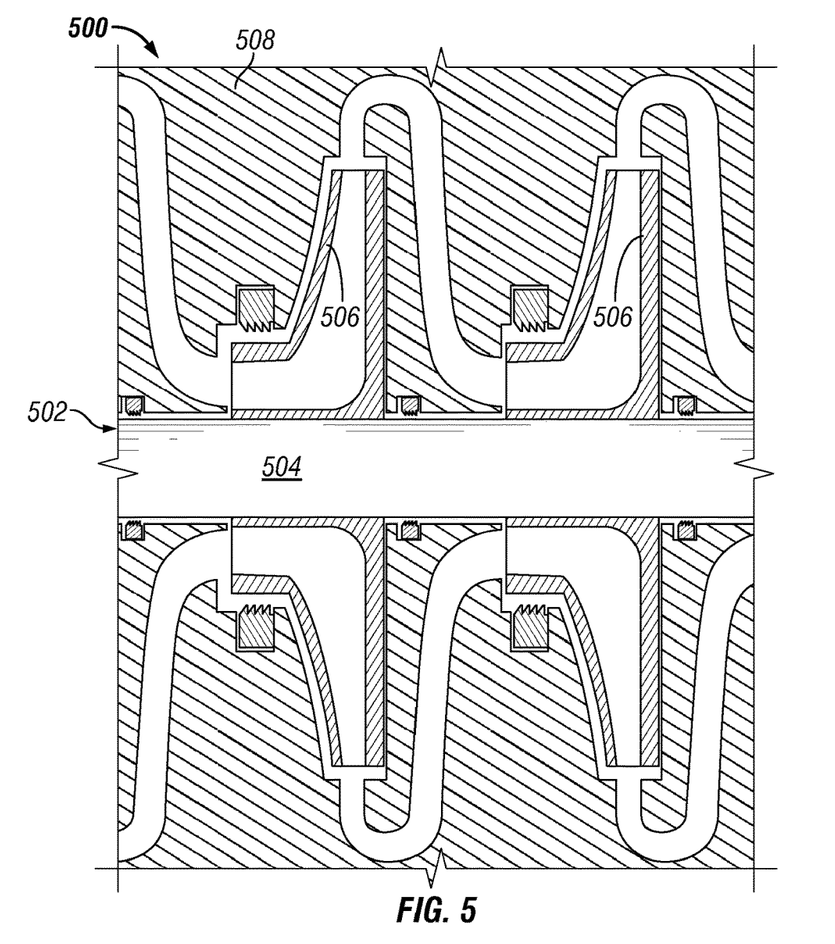
FIG. 5 illustrates a partial cross-sectional view of an exemplary turbomachine that may be fabricated with any of the layering devices described herein, according to one or more embodiments disclosed.

FIG. 5 illustrates a partial cross-sectional view of an exemplary turbomachine, illustrated as a multi-stage centrifugal compressor 500, that may be fabricated with any one of the layering devices 106, 200, 400 described herein, according to one or more embodiments. As illustrated in FIG. 5, the compressor 500 may include a rotor 502 supported by bearings (not shown). The rotor 502 may include a rotary shaft 504 having one or more impellers (two are shown 506) coupled therewith. The rotor 502 may be supported and/or disposed in a housing or casing 508 of the compressor 500 and configured to rotate within the casing 508 to compress or pressurize a process fluid.

In at least one embodiment, the layering devices 106, 200, 400 described herein may be configured to fabricate one or more components of the compressor 500 separately. For example, the layering devices 106, 200, 400 described herein may be configured to fabricate the rotary shaft 504 and/or each of the impellers 506 separately, and the rotary shaft 504 and the impellers 506 may be coupled with one another in a separate process (e.g., metallurgical bonding, mechanically fastening, etc.). In another embodiment, the layering devices 106, 200, 400 may be configured to fabricate a plurality of the components of the compressor 500 as a single or monolithic structure. For example, the layering devices 106, 200, 400 may be configured to fabricate the rotor 502 including the rotary shaft 504 and the impellers 506 as a monolithic structure.

Figure 6:
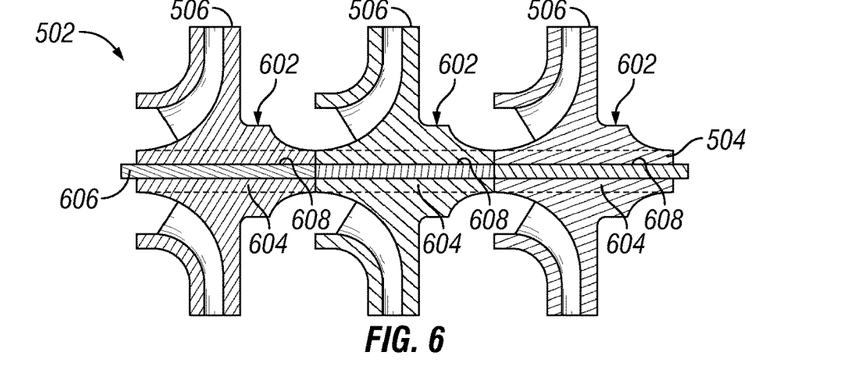
FIG. 6 illustrates sections of the rotor of FIG. 5 that may be fabricated with any of the layering devices described herein, according to one or more embodiments disclosed.

In yet another embodiment, the layering devices 106, 200, 400 may be configured to fabricate one or more portions or sections 602 of the rotor 502 separately, and the sections 602 may be subsequently coupled with one another to form the rotor 502. For example, referring to FIG. 6, the rotor 502 may be axially separated into a plurality of sections (three are shown 602), and the layering devices 106, 200, 400 may fabricate each of the sections 602 of the rotor 502 as a monolithic structure. As illustrated in FIG. 6, each of the sections 602 of the rotor 502 may include an impeller 506 and a respective portion 604 (illustrated in phantom) of the rotary shaft 504 integrally formed with one another. While FIG. 6 illustrates each of the sections 602 of the rotor 502 as having a single impeller 506, it should be appreciated that the rotor 502 may be separated such that each of the sections 602 may have two or more impellers 506.

Each of the sections 602 of the rotor 502 may be coupled with one another to form the rotor 502. In at least one embodiment, the sections 602 of the rotor 502 may be metallurgically bonded with one another. For example, the sections 602 of the rotor 502 may be metallurgically bonded with one another via a welding process, a brazing process, or the like. In another embodiment, the sections 602 may be coupled with one another via one or more mechanical fasteners (one is shown 606). For example, as illustrated in FIG. 6, each of the sections 602 may define a bore 608 extending axially therethrough and configured to receive the mechanical fastener 606 to facilitate the coupling of the sections 602 with one another and form the rotor 502. Illustrative mechanical fasteners may include, but are not limited to, one or more bolts, studs and nuts, and/or any other known mechanical fasteners.

Figure 7:
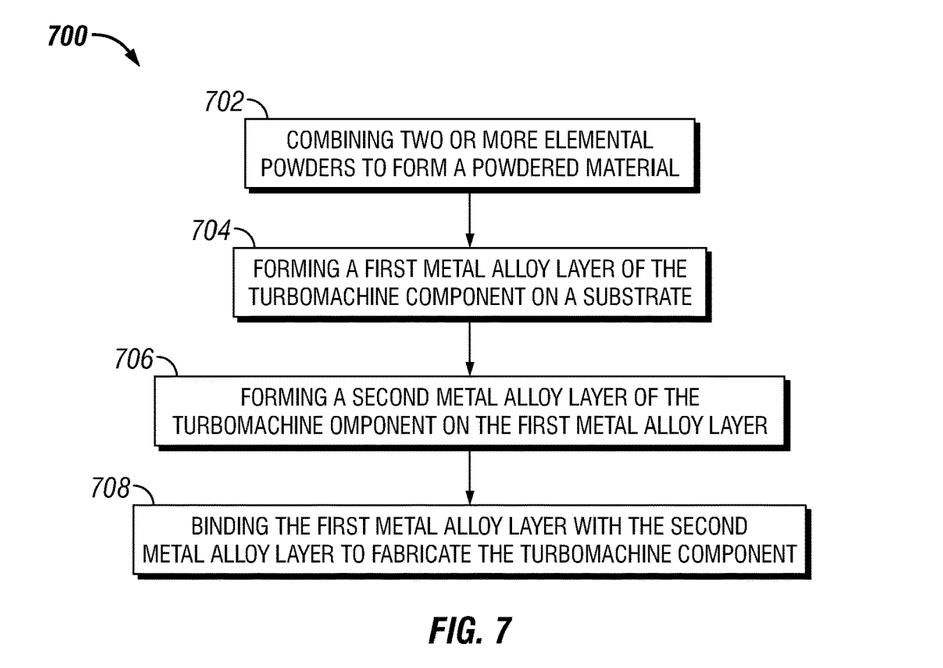
FIG. 7 illustrates a flowchart of a method for fabricating a turbomachine component, according to one or more embodiments disclosed.

FIG. 7 illustrates a flowchart of a method 700 for fabricating a turbomachine component comprising a metal alloy, according to one or more embodiments. The method 700 may include combining two or more elemental powders to form a powdered material, as shown at 702. The method 700 may also include forming a first metal alloy layer of the turbomachine component on a substrate, as shown at 704. Forming the first metal alloy layer on the substrate may include melting a first portion of the powdered material to a first molten material with a heat source, mixing the first molten material with the heat source, and cooling the first molten material to form the first metal alloy layer. The method 700 may further include forming a second metal alloy layer of the turbomachine component on the first metal alloy layer, as shown at 706. The method 700 may also include binding the first metal alloy layer with the second metal alloy layer to fabricate the turbomachine component, as shown at 708.

Figure 8:
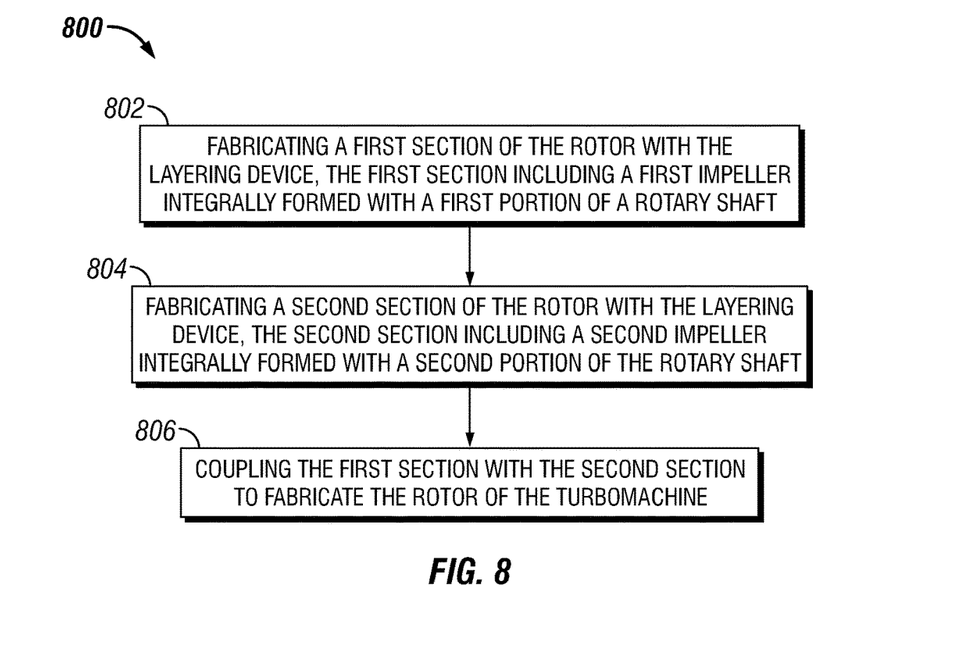
FIG. 8 illustrates a flowchart of a method for fabricating a rotor of a turbomachine with a layering device, according to one or more embodiments disclosed.

FIG. 8 illustrates a flowchart of a method 800 for fabricating a rotor of a turbomachine with a layering device, according to one or more embodiments. The method 800 may include fabricating a first section of the rotor with the layering device, the first section including a first impeller integrally formed with a first portion of a rotary shaft, as shown at 802. The method 800 may also include fabricating a second section of the rotor with the layering device, the second section including a second impeller integrally formed with a second portion of the rotary shaft, as shown at 804. The method 800 may further include coupling the first section with the second section to fabricate the rotor of the turbomachine, as shown at 806.

Figure 9:
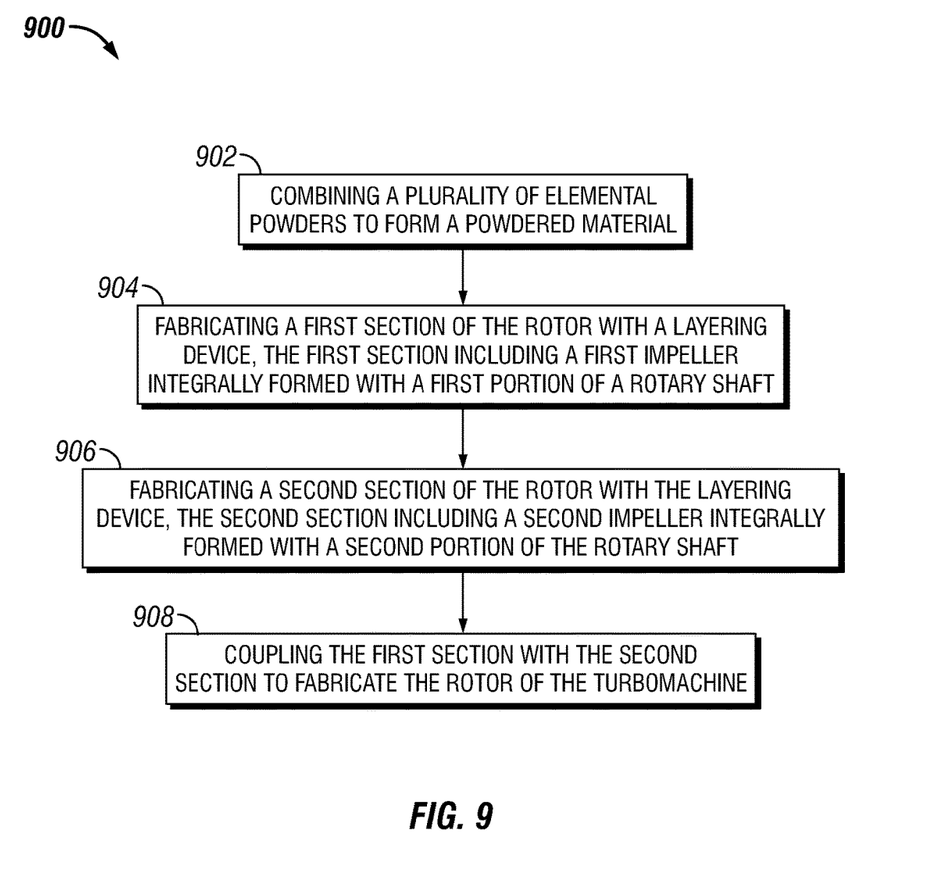
FIG. 9 illustrates a flowchart of a method for fabricating a rotor of a turbomachine including a metal alloy via additive manufacturing, according to one or more embodiments disclosed.

FIG. 9 illustrates a flowchart of a method 900 for fabricating a rotor of a turbomachine comprising a metal alloy via additive manufacturing, according to one or more embodiments. The method 900 may include combining a plurality of elemental powders to form a powdered material, as shown at 902. The method 900 may also include fabricating a first section of the rotor with a layering device, the first section including a first impeller integrally formed with a first portion of a rotary shaft, as shown at 904. Fabricating the first section with the layering device may include generating a digital model of the first section of the rotor with a computer aided design assembly, partitioning the digital model into at least a first digital cross-section and a second digital cross-section, forming a first metal alloy layer of the first section on a substrate using the first digital cross-section as a template, forming a second metal alloy layer of the first section on the first metal alloy layer, and binding the first metal alloy layer with the second metal alloy layer to fabricate the first section of the rotor. The method 900 may further include fabricating a second section of the rotor with the layering device, the second section including a second impeller integrally formed with a second portion of the rotary shaft, as shown at 906. The method 900 may also include coupling the first section with the second section to fabricate the rotor of the turbomachine, as shown at 908.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

I claim:

1. A method for fabricating a turbomachine component comprising a metal alloy, the method comprising:
combining two or more elemental powders to form a powdered material;
forming a first metal alloy layer of the turbomachine component on a substrate, wherein forming the first metal alloy layer comprises:
melting a first portion of the powdered material to a first molten material with a heat source;
mixing the first molten material with the heat source; and
cooling the first molten material to form the first metal alloy layer,
wherein mixing the first molten material with the heat source comprises directing an energy beam of the heat source along a first portion of the powdered material in a substantially circular path and/or radially oscillating the energy beam;
forming a second metal alloy layer of the turbomachine component on the first metal alloy layer; and
binding the first metal alloy layer with the second metal alloy layer to fabricate the turbomachine component.

2. The method of claim 1, wherein forming the second metal alloy layer comprises:

melting a second portion of the powdered material to a second molten material with the heat source;

mixing the second molten material with the heat source; and cooling the second molten material to form the second metal alloy layer.

3. The method of claim 1, wherein combining the two or more elemental powders with one another to form the powdered material comprises homogenously mixing the two or more elemental powders.

4. The method of claim 3, wherein the two or more elemental powders are mixed in proportions substantially equal to a stoichiometric composition of the metal alloy of the turbomachine component.

5. The method of claim 1, further comprising shaping at least one of the two or more elemental powders to provide the at least one of the two or more elemental powders with uniform shapes.

6. The method of claim 1, further comprising sizing at least one of the two or more elemental powders to reduce particle sizes of the at least one of the two or more elemental powders.

7. The method of claim 1, wherein mixing the first molten material with the heat source further comprises oscillating the energy beam along at least a portion of a radial length of the substantially circular path while concurrently directing the energy beam along the substantially circular path.

8. The method of claim 1, wherein the turbomachine component is a rotor and the method comprises:

fabricating a first section of the rotor with a layering device, the first section including a first impeller integrally formed with a first portion of a rotary shaft;

where fabricating the first section with the layering device comprises:

generating a digital model of the first section of the rotor with a computer aided design assembly;

partitioning the digital model into at least a first digital cross-section and a second digital cross-section;

forming the first metal alloy layer of the first section on a substrate using the first digital cross-section as a template, wherein forming the first metal alloy layer of the first section comprises:

melting the first portion of the powdered material to the first molten material with a laser as heat source:

mixing the first molten material with the laser; and cooling the first molten material to form the first metal alloy layer;

forming the second metal alloy layer of the first section on the first metal alloy layer; and binding the first metal alloy layer with the second metal alloy layer to fabricate the first section of the rotor;

fabricating a second section of the rotor with the layering device, the second section including a second impeller integrally formed with a second portion of the rotary shaft; and coupling the first section with the second section to fabricate the rotor of the turbomachine.

9. The method of claim 8, wherein coupling the first section with the second section to fabricate the rotor of the turbomachine comprises metallurgically bonding the first section with the second section.

10. The method of claim 8, wherein coupling the first section with the second section to fabricate the rotor of the turbomachine comprises coupling the first section with the second section with a mechanical fastener.

11. The method of claim 1, wherein forming the first metal alloy layer comprises:

melting the first portion of the powdered material to the first molten material with a heat source;

mixing the first molten material with the heat source; and cooling the first molten material to form the first metal alloy layer.

12. The method of claim 1, wherein each of the first metal alloy layer and the second metal alloy layer comprises a nickel-based superalloy.

13. The method of claim 1, wherein the powdered material comprises a lubricant selected from the group consisting of stearic acid, stearin, metallic stearates, and combinations thereof.

14. The method of claim 1, wherein at least one of the first metal alloy layer and the second metal alloy layer is a cobalt-based superalloy or a nickel-based superalloy.

* * * * *